(12) United States Patent
Saito

(10) Patent No.: US 6,317,878 B1
(45) Date of Patent: Nov. 13, 2001

(54) INFORMATION PROCESSING SYSTEM AND RECORDING MEDIA

(75) Inventor: Koji Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/859,251

(22) Filed: May 20, 1997

(30) Foreign Application Priority Data

May 22, 1996 (JP) .................................................. 8-126672

(51) Int. Cl.$^7$ .................................................. G06F 9/445
(52) U.S. Cl. .................................................. 717/11; 709/203
(58) Field of Search .................................. 395/712, 201; 709/203; 717/11; 705/1

(56) References Cited

U.S. PATENT DOCUMENTS

| | | | | |
|---|---|---|---|---|
| 5,410,598 | * | 4/1995 | Shear .................................. | 705/53 |
| 5,636,346 | * | 6/1997 | Saxe ................................... | 705/1 |
| 5,724,425 | * | 3/1998 | Chang et al. ...................... | 705/52 |
| 5,758,068 | * | 5/1998 | Brandt et al. ..................... | 713/200 |
| 5,758,069 | * | 5/1998 | Olsen ................................. | 713/201 |
| 5,771,354 | * | 6/1998 | Crawford ........................... | 709/229 |
| 5,790,664 | * | 8/1998 | Coley et al. ....................... | 709/203 |
| 5,794,217 | * | 8/1998 | Allen .................................. | 705/27 |

FOREIGN PATENT DOCUMENTS

| | | | |
|---|---|---|---|
| 0 715 246 | 6/1996 | (EP) | .................................. G06F/1/00 |
| 0 457 940 | 11/1991 | (EP) | .................................. G06F/9/445 |
| 5-204945 | 8/1993 | (JP) | .................................. G06F/15/21 |
| 97/43004 | 11/1997 | (WO) | .................................. A61N/1/372 |

OTHER PUBLICATIONS

Masayoshi, Information Selling Terminal Equipment, Information Selling System and Method Therefor, JP–A–5–165782 dated Jul. 2, 1993 *Abstract Only.

Masayoshi, Interface for Information Selling Terminal Equipment, JP–A–5–197732 dated Aug. 6, 1993 * Abstract Only.

Kokado, Software Copyright Protecting Method and Device, JP–A–6–095870 dated Apr. 8, 1994 * Abstract only.

Hiroshi, Computer and Method for Controlling Rental Period of Software, JP–A–07–234785 dated Sep. 5, 1995 * Abstract Only.

* cited by examiner

Primary Examiner—Kakali Chaki
Assistant Examiner—Hoang-Vu Antony Nguyen-Ba

(57) ABSTRACT

An electronic system having a communication unit executes specified processing by software and, in particular, an information processing system enables freely controlling upgrading of a facility of the system. The information processing system comprises a communication unit, a plurality of processing facilities run by the information processing system, a unit allocating inherent data and which is used to enable or to disable use of at least one of the processing facility, and a unit enabling the disabled use of the processing facility associated with data received via the communication unit.

33 Claims, 11 Drawing Sheets

Fig.4

| PROGRAM NAME | KEY DATA | USE ENABLING/ DISABLING FLAG |
|---|---|---|
| EXPANDED FACILITY PROGRAM A | a a a | 0 |
| EXPANDED FACILITY PROGRAM B | b b b | 1 |
| ⋮ | ⋮ | ⋮ |
| EXPANDED FACILITY PROGRAM F | f f f | 0 |

Fig.12

| PROGRAM NAME | CM DATA | USE ENABLING/ DISABLING FLAG |
|---|---|---|
| EXPANDED FACILITY PROGRAM A | CMa | 0 |
| EXPANDED FACILITY PROGRAM B | CMb | 1 |
| ⋮ | ⋮ | ⋮ |
| EXPANDED FACILITY PROGRAM F | CMf | 0 |

INFORMATION PROCESSING SYSTEM AND RECORDING MEDIA

BACKGROUND OF THE INVENTION

1. Field of the Invention

The present invention relates to an information processing system having a communication facility and executing processing of various facilities by software. More particularly, this invention is concerned with an information processing system making it possible to freely improve the facilities.

In recent years, an information processing system for executing, by software processing, various facilities, such as a facsimile system and a word-processor, has widely prevailed in the market. According to the present invention, such an information processing system can be reconstructed as a system having new facilities different from the previously installed facilities by effectively utilizing a communication facility thereof and the like.

2. Description of the Related Art

In the past, an information processing system (for example, a facsimile system and a word-processor) for executing specified processing by software has been designed so that all software facilities owned by the system are user-visible.

On the side of manufacturers, a certain information processing system is made available in a plurality of models ranging from a low-grade model to a high-grade model, and manufactured as products of the models having software, for realizing associated facilities, implanted. The products are then put on the market. For upgrading a facility of an information processing system, for example, for releasing a facsimile system with a broadcasting facility added newly, an information processing system with software for realizing the new facility implanted newly is manufactured and put on the market.

However, on the side of the manufacture, it is a critical problem in terms of manufacturing cost and management cost that despite the fact that the system is the same, a different product must be manufactured for each model in order to install a different facility, or a new product must be manufactured in order to upgrade a facility, though this has been indispensable in the past.

In recent years, information processing systems, including personal computers, to be connected to various networks over communication lines have increased rapidly due to the prevalence of data communication using personal computers. In particular, now that the Internet has become popular, manufacturers can provide individual persons with commercial information through mass media including known television and radio.

Moreover, since large-capacity storage media, including CD-ROMs, that are now included as standard components in personal computers have been widely adopted, it is easy to embed commercial information in the form of voice, characters (text), or motion pictures.

Consequently, the commercial expense and the like that a manufacturer must pay the mass media in return for providing individual commercial information via a host system, a network, or a storage media can be allotted for meeting part or the whole of the expenses incurred for developing an information processing system that is a destination of the commercial information or for upgrading a facility of the information processing system.

SUMMARY OF THE INVENTION

Accordingly, an object of the present invention is to provide an information processing system making it possible to readily control upgrading of a facility while using the same hardware.

Another object of the present invention is to provide an information processing system in which a burden (i.e., an expense) to be incurred for upgrading a facility of the information processing system is lightened (i.e., reduced or waived) in return for receiving and providing commercial information in the form of voice, characters (text), or images via a host system, network, or storage medium.

According to the present invention, there is provided an information processing system comprising: a communication means; a plurality of processing facilities to be run by the information processing system; a means for allocating inherent data, which is used to disable or enable use, to at least one of the processing facilities, and disables the use of the one processing facility; and a means for enabling the disabled use of the processing facility associated with data received via the communication means.

According to the present invention, the information processing system enables use of a processing facility, to which the data is allocated, for a given period after the start of use.

According to the present invention, there is provided an information processing system with a communication means comprising: a processing facility to be run by the information processing system; a means for disabling the use of the processing facility; a means for receiving publicity information via the communication means; and a means for enabling the use of the processing facility, which is disabled by the disabling means, under the condition that the publicity information received via the communication means be output and displayed.

According to the present invention, the means for enabling the disabled use of the processing facility enables use of a processing facility associated with the received publicity information. The information processing system enables the disabled use of the processing facility for a given period after the start of use.

According to the present invention, there is provided an information processing system comprising: processing facilities to be run by the information processing system; a means for disabling use of at least one facility of the information processing system; and a means for storing publicity information. Herein, the use disabled by the disabling means is enabled under the condition that the publicity information be output or displayed.

According to the present invention, the means for enabling the disabled use of a processing facility enables the disabled use of a processing facility associated with the publicity information. The information processing system enables the disabled use of the processing facility for a given period after the start of use.

According to the present invention, the processing facilities are provided as software or programs to be run under the information processing system. The software or programs are provided in the form of storage media in which programs for realizing the facilities of the information processing system are recorded and which are readable by the information processing system.

BRIEF DESCRIPTION OF THE DRAWINGS

The present invention will be more clearly understood from the description as set forth below with reference to the accompanying drawings.

FIG. 4 is a diagram showing an example of an expanded facility management table (1);

FIG. 12 is a diagram showing an example of an expanded facility management table for the system shown in FIG. 11.

DESCRIPTION OF THE PREFERRED EMBODIMENTS

Figure 1:
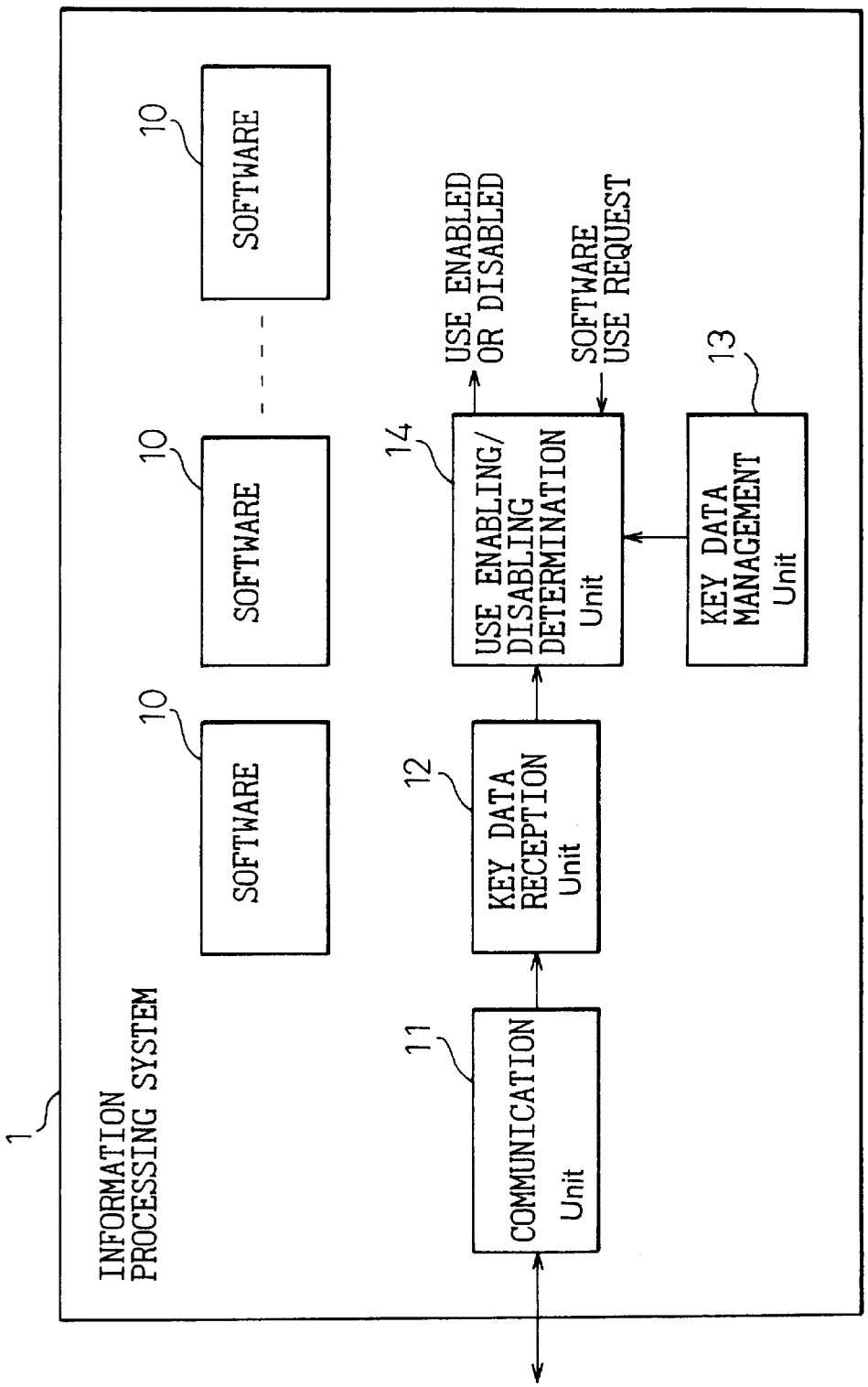
FIG. 1 is a first diagram showing fundamental constituent features of an information processing system in accordance with the present invention.

FIG. 1 is a first diagram showing fundamental constituent features of an information processing system in accordance with the present invention.

In FIG. 1, an information processing system 1 comprises a plurality of software 10, a communication unit 11, a key data reception unit 12, a key data management unit 13, and use enabling/disabling determination unit 14.

The software means 10 execute specified processing assigned thereto, for example, a broadcasting facility and polling facility in the case of a facsimile system, a font adding facility in the case of a word-processor, and an access timing setting facility in the case of a memory. The communication means 11 carries out communications with external networks according to various communication protocols including a low-order HDLC and a high-order TCP/IP.

The key data reception means 12 receives externally-sent key data (for example, a public key or password). The key data management means 13 manages the relationships of correspondence between the software means 10 and inherent key data allocated to the software means in the form of, for example, a table. When a use request for any software means 10 is issued from a program within the system, an external user, or the like, the use enabling/disabling determination means 14 references the key data management means 13 to determine whether the use should be enabled or disabled, and reports the result to the use request source.

In an initial state of the information processing system 1, the use enabling/disabling determination means 14 disables use of a software means 10 to which key data is allocated. In response to a use request for the software means 10 in the state, Use Disabled is reported to the use request source.

Thereafter, when the key data reception means 12 receives key data, the use enabling/disabling determination means 14 references management data registered in the key data management means 13, and specifies a software means 10 indicated with the received key data. As a result, the use enabling/disabling determination means 14 newly enables the currently disabled use of the specified software means 10, and reports Use Enabled to the use request source for the software means 10.

Thus, in the information processing system 1 according to the present invention, use of a software means 10 associated with key data is enabled under the condition that the key data be sent externally. This means that a facility of the information processing system 1 can be upgraded readily under the condition that a user should pay a fee dependent on an added facility. As a result, it is readily realized that one system is available in a plurality of models having different facilities.

Figure 2:
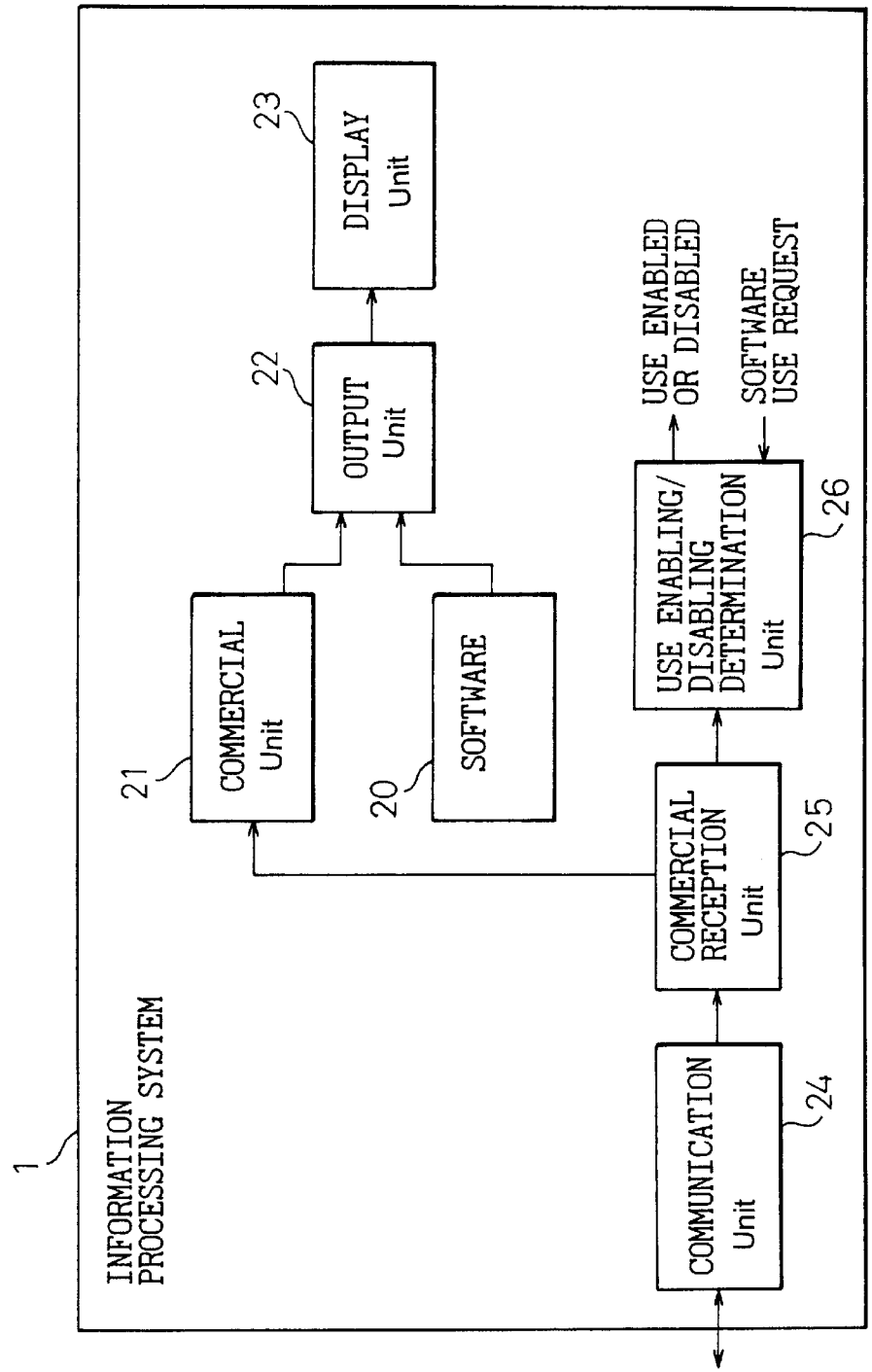
FIG. 2 is a second diagram showing fundamental constituent features of an information processing system in accordance with the present invention.

FIG. 2 is a second diagram showing fundamental constituent features of an information processing system in accordance with the present invention.

In FIG. 2, an information processing system 1 in accordance with the present invention comprises software 20, commercial unit 21, output unit 22, display unit 23, communication unit 24, commercial reception unit 25, and use enabling/disabling unit 26.

The software 20 executes specified processing. In this example, only one software 20 is illustrated. A plurality of such software may be included, like the plural softwares 10 in FIG. 1. The commercial reception means 25 receives publicity information over an external network or the like via the communication means 24. The communication means 24 is identical to the communication means 11 shown in FIG. 1.

The commercial means 21 is activated while being interlocked with the software 20, and produces publicity information received by the commercial reception means 25. The output means 22 outputs processing information handled by the software means 20 and publicity information produced by the commercial means 21, and the display means 23 displays the information. The use enabling/disabling determination means 26 determines whether use should be enabled or disabled in response to a use request for the software 20, and reports the result to the use request source.

Even in the information processing system 1 of this example, in an initial state, the use enabling/disabling determination means 26 disables use of the software means 20, and therefore reports Use Disabled to the use request source in response to a use request for the software means 20.

When the commercial means 21 is activated with reception by the commercial reception means 25, the use enabling/disabling determination means 26 newly enables currently the disabled use of the software 20, and thereafter reports Use Enabled to the use request source in response to any use request for the software 20. As a result, the commercial means 21 is activated while being interlocked with the software 20, and displayed together with publicity information on the display means 23.

As mentioned above, in the information processing system 1 of this example, use of the software 20 is enabled under the condition that commercial information be sent externally. The commercial means 21 interlocked with the software 20 is activated, whereby a commercial requested by a sponsor such as a manufacturer can be broadcast reliably with use of the software 20. As shown in FIG. 1, use of only a specific software 20 associated with individual received commercial information may be enabled selectively.

Embodiments of the present invention will be explained in more detail below.

Figure 3:
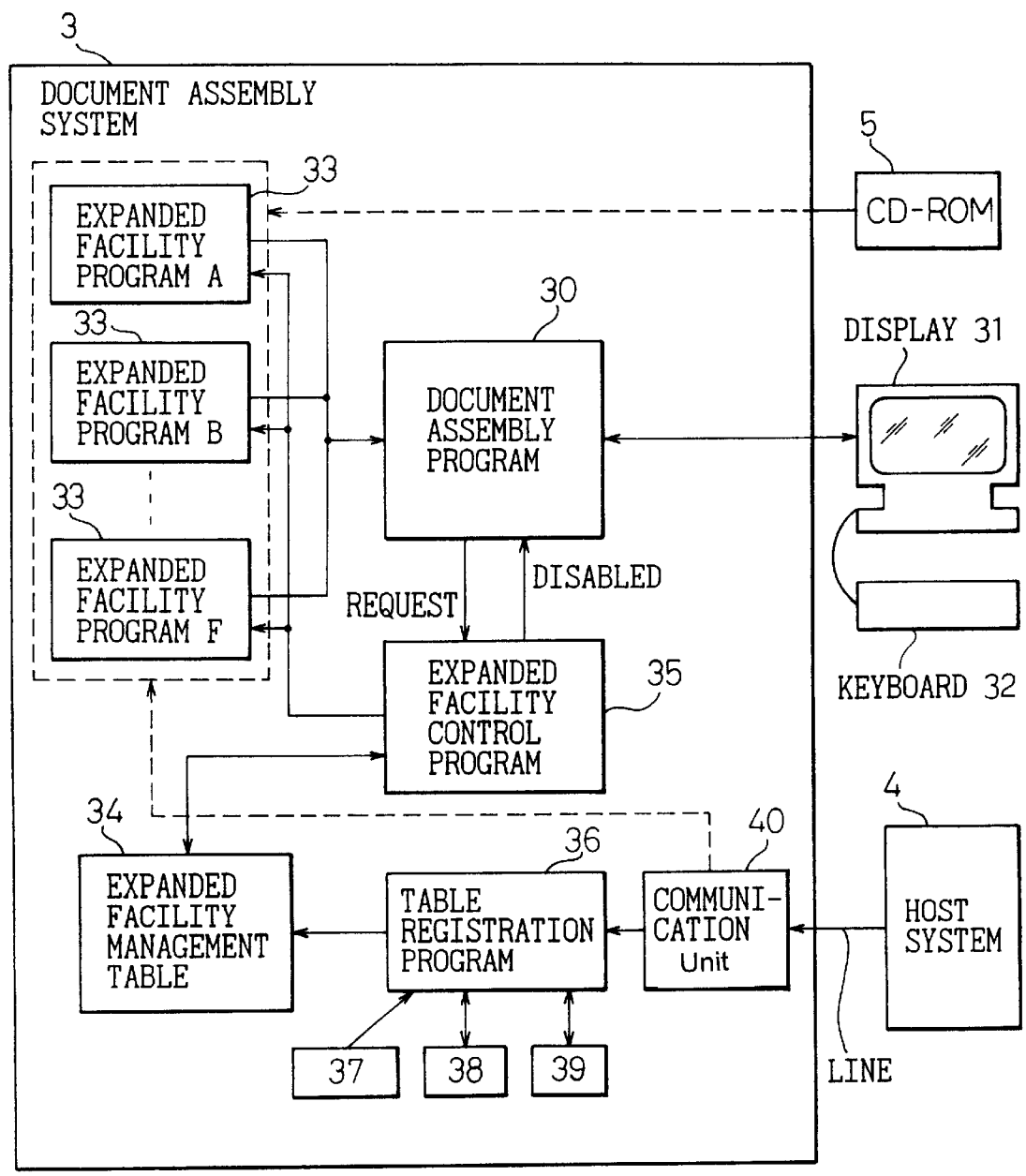
FIG. 3 is a diagram showing an embodiment of a document assembly system corresponding to the system shown in FIG. 1.

FIG. 3 shows an exemplary embodiment of the system shown in FIG. 1, that is, an example of a document assembly system in which the present invention is implemented.

In FIG. 3, a document assembly system 3 is connected to a host system 4 over a line, and comprises a document assembly program 30, a display 31, a keyboard 32, a plurality of expanded facility programs 33, an expanded facility management table 34, an expanded facility control program 35, a table registration program 36, a clock 37, a use start flag 38, and a Disabled setting flag 39.

The document assembly program 30 creates a document while displaying character information entered at the keyboard 32 on the display 31. The expanded facility programs 33 are prepared for expanding the facilities of the document assembly program 30, and support document assembly by the document assembly program 30. The expanded facility programs 33 are not limited to programs installed in the main unit of the document assembly system 3 in advance but may be, as indicated with dashed lines in FIG. 3, programs to be downloaded from storage media 5 such as CD-ROMs connected to the main unit or those to be downloaded from the host system 4 via the communication means 40.

The expanded facility management table 34 manages information indicating whether or not the expanded facility programs 33 are usable. The expanded facility control program 35 activates the expanded facility programs 33, and informs the document assembly program 30 of the fact that any of the expanded facility programs 33 is unusable, i.e., disabled.

The table registration program 36 registers information, which indicates whether use of each of the expanded facility programs 33 is enabled or disabled, in the expanded facility management table 34. The use start flag 38 manages information indicating whether or not the document assembly system 3 has been used. The Disabled setting flag 39 manages information indicating whether or not initialization is carried out, to set Use Disabled in the expanded facility management table 34.

FIG. 4 shows an example of the expanded facility management table 34.

As shown in FIG. 4, the expanded facility management table 34 manages the relationships of correspondence between the expanded facility programs 33 and inherent key data allocated to the expanded facility programs 33, and also manages use enabling/disabling flags indicating whether or not the expanded facility programs 33 are usable.

For example, key data "aaa" is allocated to an expanded facility program A. Moreover, a use enabling/disabling flag with a value "0" is given to the program A. In this case, the use of the expanded facility program A is disabled. Likewise, key data "bbb" is allocated to an expanded facility program B. A use enabling/disabling flag with a value "1" indicates that the use of the expanded facility program B is enabled.

Figure 5A:
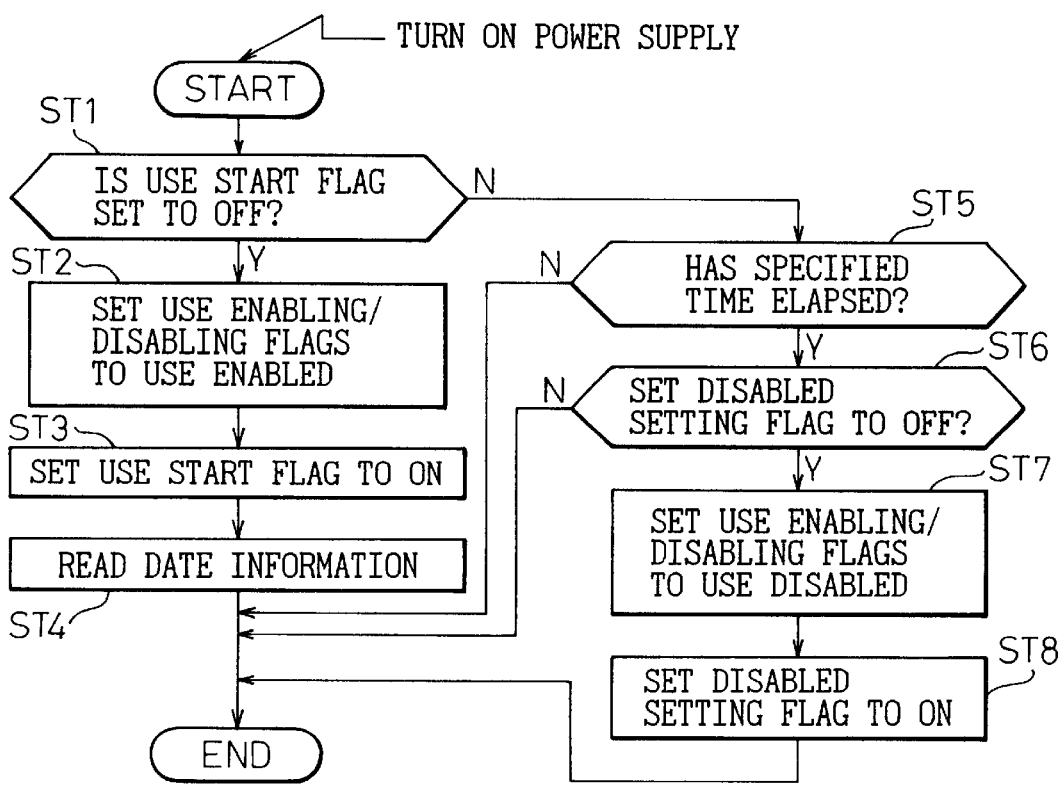
FIG. 5A is a diagram showing an example (1) of a processing flow for executing a table registration program.
Figure 5B:
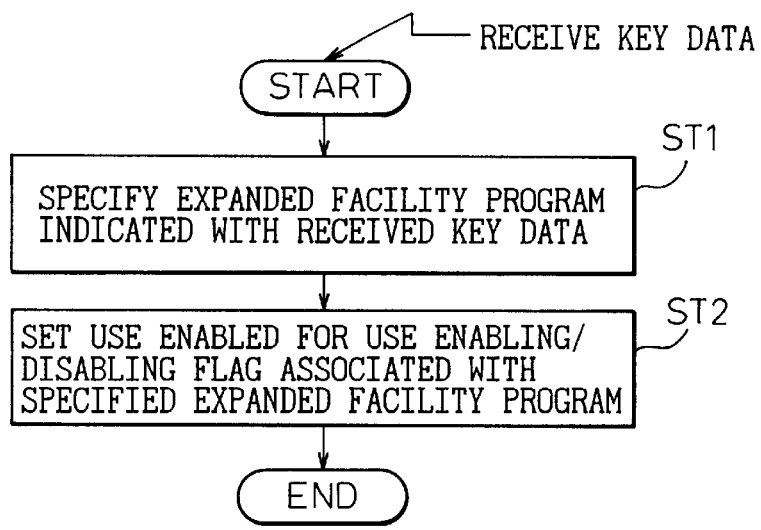
FIG. 5B is a diagram showing an example (2) of the processing flow for executing a table registration program.
Figure 6:
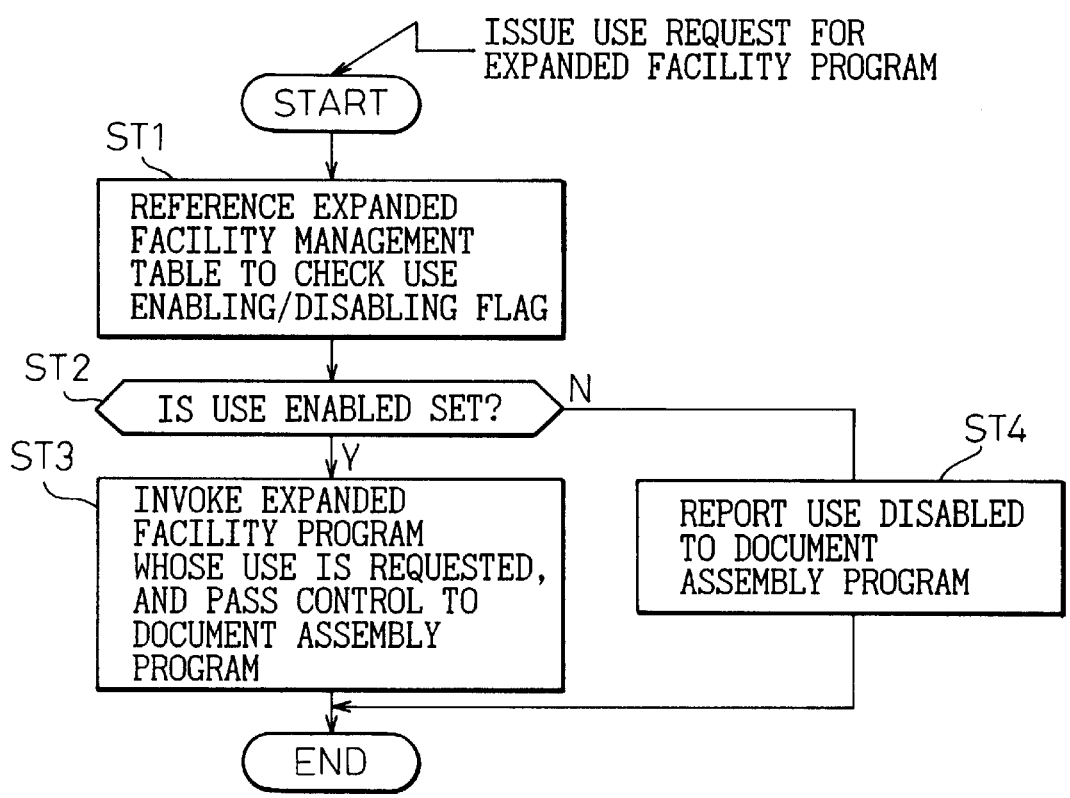
FIG. 6 is a diagram showing an example of a processing flow for executing an expanded facility control program.

FIGS. 5A and 5B shows an example of a processing flow for executing the table registration program 36 shown in FIG. 3. FIG. 6 shows an example of a processing flow for executing the expanded facility control program 35 shown in FIG. 3.

Next, the present invention will be explained in detail according to the processing flows.

When the power supply of the document assembly system 3 is turned on, the table registration program 36 judges at step 1 (ST1), as described in the processing flow of FIG. 5A, whether or not the use start flag 38 is set to OFF. As described later, when the document assembly system 3 has been used in the past, the use start flag 38 is set to ON. It is therefore judged at step 1 whether or not the document assembly system 3 has already been used.

If it is judged at step 1 that the use start flag 38 is set to OFF, that is, if it is judged that this turning on of the power supply of the document assembly system 3 is the first turning on, all the use enabling/disabling flags in the expanded facility management table 34 shown in FIG. 4 are set to "1" meaning Use Enabled. At step 3 (ST3), the use start flag 38 is changed from OFF to ON. At step 4 (ST4), date information indicated by the clock 37 is read, and this processing is terminated.

In contrast, if it is judged at step 1 that the use start flag 38 is set to ON, that is, this turning on of the power supply is not the first turning on of the power supply, date information indicated by the clock 37 is read at step 5 (ST5), and a difference from the date information read at step 4 is calculated. If a specified time, for example, one month has not elapsed since the first turning on of the power supply, the processing is terminated.

On the contrary, if it is judged at step 5 that the specified time has elapsed since the first turning on of the power supply, control is passed to step 6 (ST6). It is judged whether or not the Disabled setting flag 39 is set to OFF. As described later, if all the use enabling/disabling flags (FIG. 4) in the expanded facility management table 34 are initialized to Use Disabled, the Disabled setting flag 39 is set to ON.

If it is judged at step 6 that the Disabled setting flag 39 is set to ON, that is, the use enabling/disabling flags in the expanded facility management table 34 are initialized to Use Disabled, the processing is terminated. On the contrary, if the Disabled setting flag 39 is set to OFF, that is, all the use enabling/disabling flags (FIG. 4) in the expanded facility management table 34 have not been initialized to Use Disabled or OFF (a value "0"), all the use enabling/disabling flags in the expanded facility management table 34 are set to OFF at step 7 (ST7). At step 8, the Disabled setting flag 39 is set to ON in order to indicate the fact, and then the processing is terminated.

When a user pays a use fee specific to an expanded facility program 33, the table registration program 36 receives key data allocated to the expanded facility program 33 from the host system 4 via the communication means 40. At step 1 (ST1) in the processing flow shown in FIG. 5B, the expanded facility program 33 associated with the received key data is specified by referencing the expanded facility management table 34. At step 2 (ST2), a value "1" indicating Use Enabled is set for the use enabling/disabling flag associated with the specified expanded facility program 33. The processing is then terminated.

As mentioned above, when the table registration program 36 executes processing according to the processing flows described in FIGS. 5A and 5B, use of all the expanded facility programs 33 is enabled for a specified period after a user purchases the document assembly system 3 and then turns on the power supply of the document assembly system 3. That is to say, in the expanded facility management table 34, all the use enabling/disabling flags associated with the expanded facility programs 33 are set to a value "1."

After the period elapses, all the use enabling/disabling flags in the expanded facility management table 34 are set to a value "0" in order to disable the use of the expanded facility programs 33. Thereafter, when a use fee of an expanded facility program 33 is paid, key data is received from the host system 4. The use of the expanded facility program 33 indicated with the key data is then enabled. In other words, a value "1" indicating that the use of the associated expanded facility program 33 is enabled is set independently with payment of the use fee.

When the table registration program 36 carries out registration as mentioned above, if a user issues a use request for an expanded facility program 34 via the document assembly program 30, the expanded facility control program 35 references, as described in the processing flow in FIG. 6, the expanded facility management table 34 to check the use enabling/disabling flag associated with the expanded facility program 35, of which use is requested, at step 1 (STP1). At step 2 (STP2), it is judged whether or not a value "1" is set for the use enabling/disabling flag.

If it is judged at step 2 that the value "1" is set for the use enabling/disabling flag, the expanded facility program 33 whose use is requested is invoked at step 3 (STP3). Control is then passed to the document assembly program 30. As a result, the user can use the expanded facility program 33, for which the user issued a user request, to create a document (i.e., readily). On the contrary, if it is judged at step 2 that a value "0" is set for the use enabling/disabling flag, the fact that the expanded facility program 33 is unusable is reported to the user via the document assembly program 30 at step 4 (STP4).

As mentioned above, the document assembly system 3 in which the present invention is implemented is designed so that use of each expanded facility program 33 is enabled under the condition that key data is sent from the host system 4. A facility can be upgraded under the condition that the fee of an expanded facility program 33 is paid. Eventually, it can be realized readily that one system is available in a plurality of models having different facilities.

In this embodiment, a user is permitted to use all the expanded facility programs 33 for a specified period after the start of use. This mode need not always be adopted. An accumulated use time of a user may be adopted as the period. In this embodiment, the use enabling/disabling flags are associated with all the expanded facility programs 33. Alternatively, part of the expanded facility programs may be user-visible.

Furthermore, in this embodiment, the use enabling/disabling flags in the expanded facility management table 34 are used to control enabling or disabling of use of the expanded facility programs 33. Alternatively, the expanded facility management programs 33 may manage key data by themselves, and key data sent from the host system 4 may be stored in the expanded facility management table 34. In response to a use request for an expanded facility program 33, the expanded facility program 33 itself references the expanded facility management table 34 to check if own key data is stored. Depending on whether or not key data is stored, use enabling or disabling may be controlled.

Figure 7:
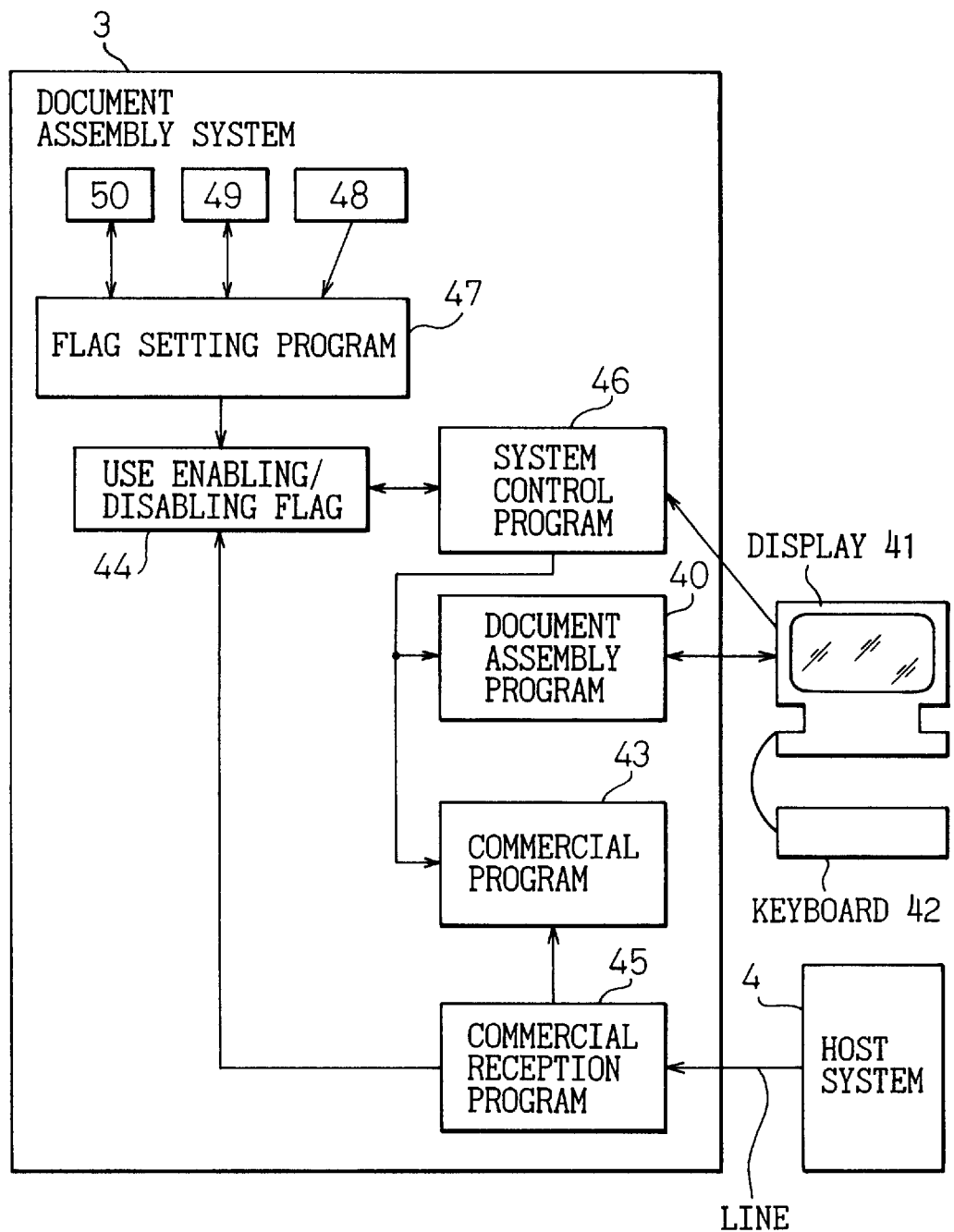
FIG. 7 is a diagram showing an embodiment of a document assembly system corresponding to the system shown in FIG. 2.

FIG. 7 shows an embodiment of a document assembly system 3 having the second fundamental constituent features of the present invention shown in FIG. 2.

In FIG. 7, a document assembly system 3 is connected to a host system 4 over a line, and comprises a document assembly program 40, a display 44, a keyboard 42, a commercial program 43, a use enabling/disabling flag 44, a commercial reception program 45, a system control program 46, a flag setting program 47, a clock 48, a use start flag 49, and a Disabled setting flag 50.

The document assembly program 40 creates a document while displaying character information entered at the keyboard 42 on the display 41. The commercial program 43 produces publicity information requested by a sponsor and displays it on the display 41. The use enabling/disabling flag 44 manages information indicating whether the use of the document assembly program 40 is enabled or disabled. The commercial reception program 45 receives the commercial program 43 sent from the host system 4, and registers information, which indicates that the use of the document assembly program 40 is enabled, in the use enabling/disabling flag 44.

The system control program 46 controls activation of the document assembly program 40 and commercial program 43. The flag setting program 47 registers information, which indicates whether the use of the document assembly program 40 is enabled or disabled, in the use enabling/disabling flag 44. The use start flag 49 manages information indicating whether or not the document assembly system 3 has been used. The Disabled setting flag 50 manages information indicating whether or not the use enabling/disabling flag 44 has been initialized to Use Disabled.

Figure 8:
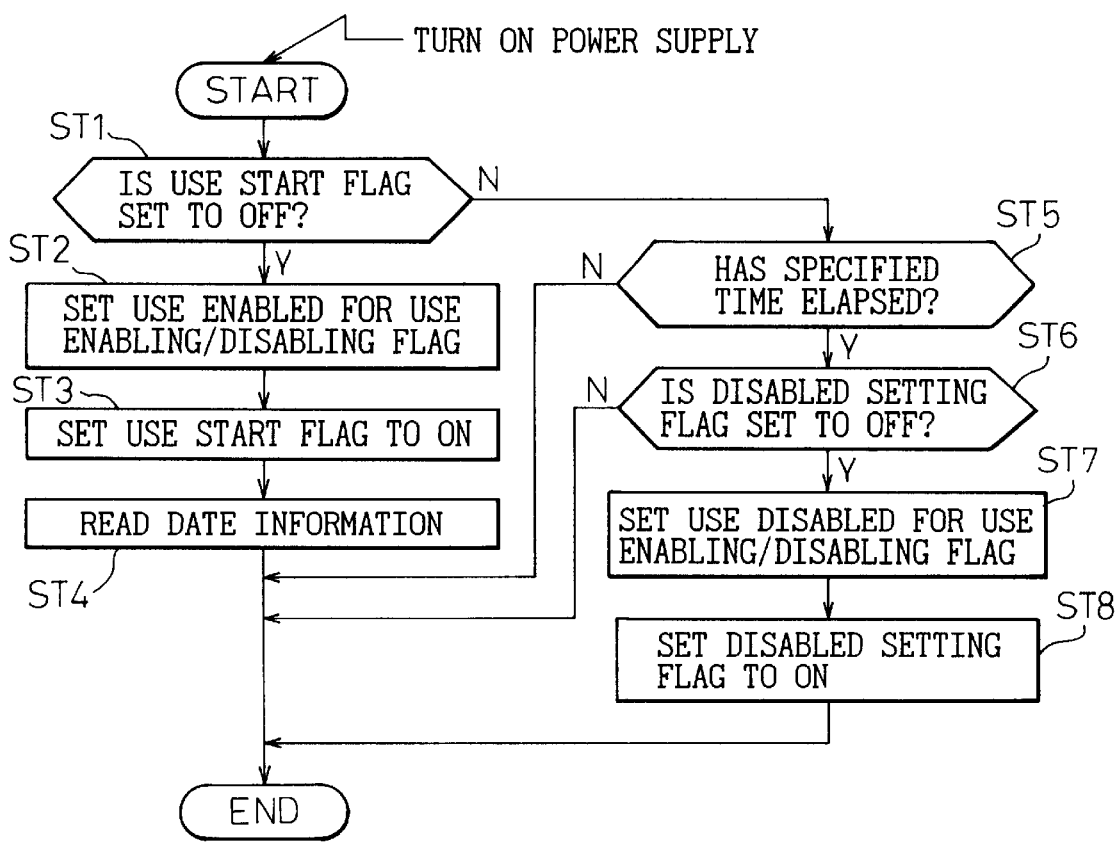
FIG. 8 is a diagram showing an example of a processing flow for executing a flag setting program.
Figure 9:
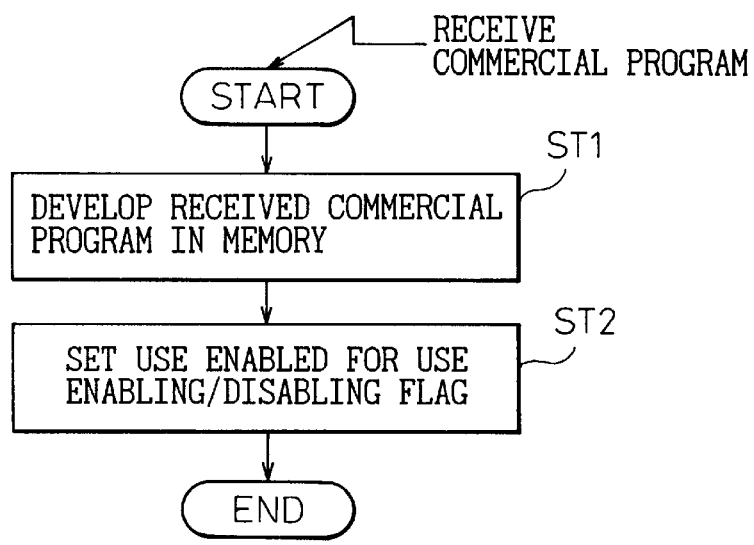
FIG. 9 is a diagram showing an example of a processing flow for executing a commercial reception program.
Figure 10:
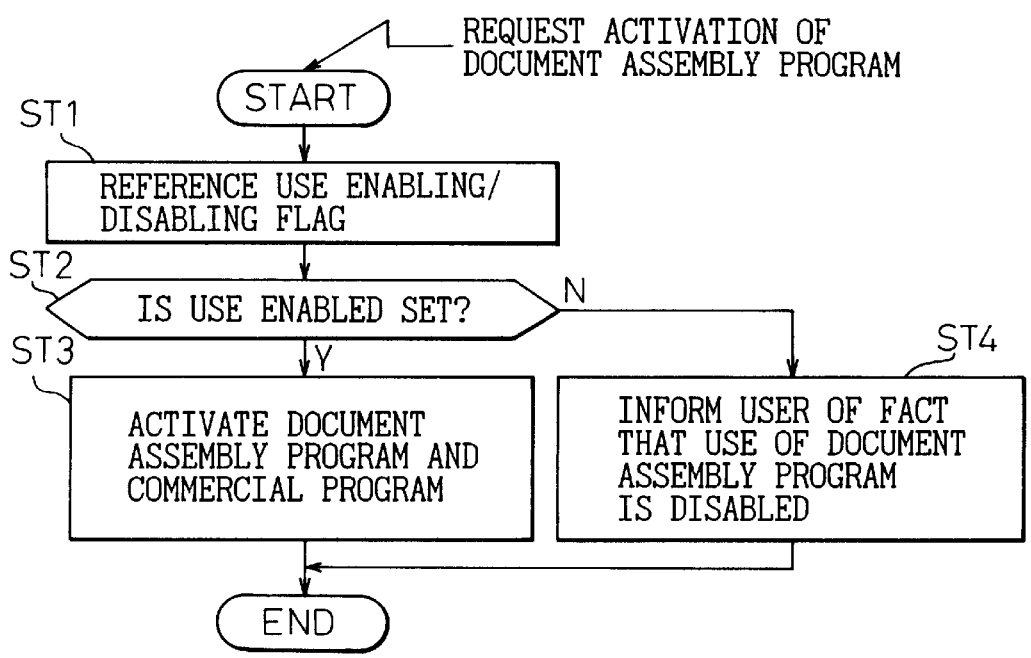
FIG. 10 is a diagram showing an example of a processing flow for executing a system control program.

FIG. 8 shows an example of a flow of processing to be executed by the flag setting program 47, FIG. 9 shows an example of a flow of processing to be executed by the commercial reception program 45, and FIG. 10 shows an example of a flow of processing to be executed by the system control program 46. These processing flows will be explained in detail below.

In FIG. 8, the flag setting program 47 is run when the power supply of the document assembly system 3 is turned on. The contents of the processing are basically identical to the contents of the processing executed by the table registration program 36 described in FIG. 5A.

Specifically, when the power supply of the document assembly system 3 is turned on, the flag setting program 47 set a value "1," which indicates that use of the document assembly program 40 is enabled for a specified period after a user purchases the document assembly system 3, for the use enabling/disabling flag 44 (ST2). After the period elapses, a value "0" indicating that the use of the document assembly program 40 is disabled is set (ST7).

Thereafter, as described in FIG. 9, the user issues a use request for the document assembly program to the host system 4. When the commercial reception program 45 receives the commercial program 43 from the host system 4, the commercial reception program 45 develops the received commercial program 43 in a memory (ST1), and sets the value "1" for the use enabling/disabling flag 44, which indicates that the use of the document assembly program 40 is enabled.

The value "1" indicating that the document assembly program 40 can be used on trial without restraint for a specified period after the user purchases the document assembly system 3 is set, for the use enabling/disabling flag 44. After the period elapses, the value "0" indicating that the use of the document assembly program 40 is disabled, in principle is set. The value "1" indicating that the currently disabled use of the document assembly program 40 is newly enabled is then set under the condition that the commercial program 43 be received.

As described in FIG. 10, the system control program 46 receives the value of the use enabling/disabling flag 44. If a user issues a use request for the document assembly program 40, the system control program 46 references the use enabling/disabling flag 44 to retrieve the value at step 1 (ST1). At step 2 (ST2), it is judged whether or not the value "1" is set for the use enabling/disabling flag 44.

If it is judged at step 2 that the value "1" is set for the use enabling/disabling flag, the document assembly program 40 is activated at step 3 (ST3). At the same time, it is judged whether or not the commercial program 43 is developed in the memory. If the commercial program 43 is developed, the commercial program is also activated.

Thereafter, the activated document assembly program 40 executes document assembly through interaction with the user. The commercial program 43 produces publicity information requested by a sponsor and displays it in a small window screen or the like which is defined for displaying a commercial in a document assembly screen allocated to the document assembly program 40.

By contrast, if it is judged at step 2 that the value "0" is set for the use enabling/disabling flag, it is reported to the user that the use of the document assembly program 40 is disabled.

As mentioned above, the document assembly system 3 of this embodiment enables use of the document assembly program 40 under the condition that the commercial program 43 be sent from the host system 4, and activates the commercial program 43 responsively to activation of the document assembly program 40. Consequently, received commercial information that is requested by a sponsor can reliably be presented to a user.

As described in conjunction with the embodiment shown in FIG. 3, even in this embodiment, the use of the document assembly program 40 need not always be enabled for a specified period after the start of use. An accumulated use time of a user may be adopted as the period. Furthermore, only when the commercial program 43 operates, the use of the document assembly program 40 may be enabled.

Figure 11:
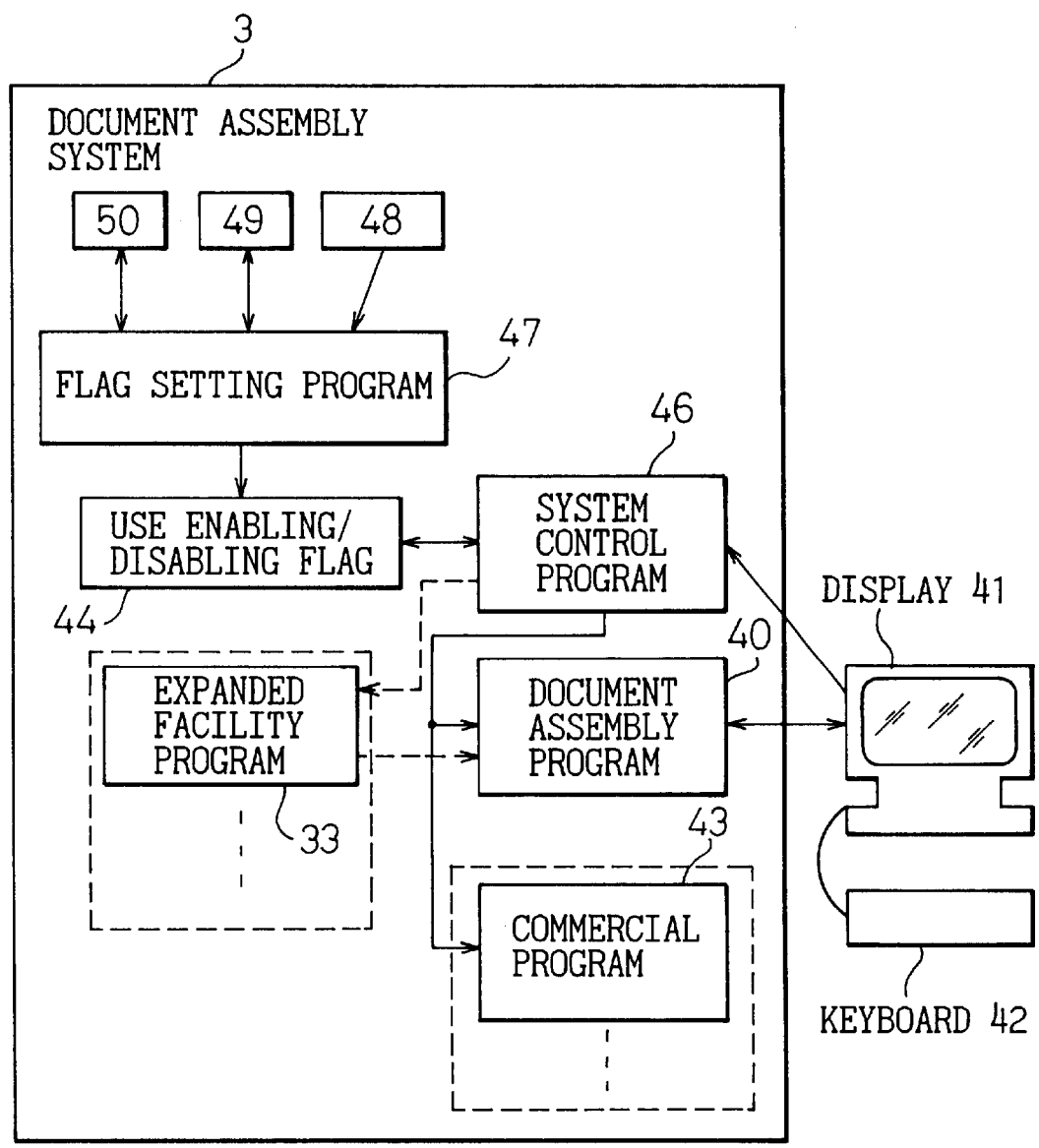
FIG. 11 is a diagram showing an embodiment of a document assembly system in which a commercial program is installed in advance.

In this embodiment, the commercial program 43 received from the host system 4 is loaded in a memory in the main unit of the system. The commercial program 43 loaded previously is replaced with the newly received commercial program 43. The replacement, that is, the program update makes the commercial program 43 stored in the memory up-to-date all the time. The system control program 46 reads the latest commercial program 43 from the memory and displays it on the display 41. Alternatively, the commercial program 43 may be installed in the document assembly system 3 in advance. FIG. 11 shows an embodiment in which the commercial program 43 is installed in the document assembly system 3 in advance.

In this case, the means responsible for communication shown in FIG. 7, that is, the commercial reception program 45 is unnecessary. When the specified period has elapsed after the start of use, the system control program 46 responds to a use request for the document assembly program issued from a user, and enables the use of the document assembly program under the condition that the commercial program stored in the main unit be activated.

Furthermore, when components enclosed with dashed lines in FIG. 11 (or FIG. 7) are added, this embodiment can operate in the same manner as the embodiment shown in FIG. 3. In this embodiment, the plurality of expanded facility programs 33 shown in FIG. 3, and a plurality of commercial programs 43 associated with the expanded facility programs 33 are included. In the use enabling/disabling flag 44, a new table (FIG. 12) comparable to the expanded facility management table shown in FIG. 4 is included.

ID data (CMa, CMb, etc.) of commercials comparable to the key data in FIG. 4 is mapped into the expanded facility management table shown in FIG. 12. According to this embodiment, whether the system is used as a stand-alone equipment as shown in FIG. 11 or the system is used in combination with the communication facility as shown in FIG. 7, the system can be readily constructed as a system in which use of an expanded facility program 33 is enabled in return for output of an associated commercial.

The detailed operation of the system is equivalent to a combination of the aforesaid operations of the embodiments shown in FIGS. 3 and 7. The operation will therefore not be described. According to this embodiment, it is expected that a plurality of sponsors will share the cost of upgrading the facilities of an information processing system. This is quite advantageous in terms of reducing the cost of upgrading the facilities of an information processing system.

The present invention has been disclosed in conjunction with the embodiments. The present invention is not limited to the embodiments. For example, the application of the present invention is not limited to the document assembly system 3 of each embodiment. The present invention can apply to another information processing system such as a facsimile system.

As described so far, an information processing system in accordance with the present invention includes a communication facility, has a plurality of processing facilities provided as a plurality of software packages, and is desired to enable use of software under the condition that key data be sent externally. A facility can be upgraded under the condition that a user should pay a fee. It can be realized that one system is available in a plurality of models having different facilities.

According to the information processing system of the present invention, whether the system is used as a stand-alone equipment or used in combination with a communication facility, use of software is enabled under the condition that a user should issue a use request or a commercial program be received externally, and a commercial interlocked with the software is output at the same time. It is therefore expected that a sponsor, that is, an entity seeking publicity, will share the cost of upgrading a facility of the information processing system. Eventually, a facility of the information processing system can be upgraded at lower cost.

What is claimed is:

1. An apparatus, comprising:
   a communication unit;
   a plurality of processing facilities preinstalled in the apparatus and restricted in use by use enabling data;
   a unit allocating, to at least a selected one of the plurality of processing facilities, respective data used to enable or disable use of each said selected processing facility; and
   a unit newly enabling a currently disabled use of a selected processing facility in response to commercial consideration from a requester of the use and to respectively associated use enabling data received via the communication unit.

2. The apparatus according to claim 1, wherein said processing facilities are provided as software, or programs, to be run by said apparatus.

3. An apparatus, comprising:
   a communication unit;
   a plurality of pre-installed processing facilities;
   a unit allocating, to at least a selected one of the plurality of pre-installed process facilities, respective data used to enable or disable use of each said selected processing facility;
   a unit newly enabling a currently disabled use of a selected pre-installed processing facility in response to commercial consideration from a requester of the use and to respectively associated use enabling data received via the communication unit, wherein said apparatus newly enables the currently disabled use of each selected processing facility, to which the respective enabling data is allocated, for a given period after the start of the enabled use thereof.

4. An apparatus as recited in claim 3, wherein the commercial consideration from a requester of the use comprises at least one of the class of commercial considerations including a verbal commercial communication to the requester, an advertisement for visual display to the requester and a payment made, or to be made, by the requester.

5. An apparatus, comprising:
a communication unit;
a plurality of pre-installed processing facilities;
a unit allocating, to at least a selected one of the plurality of pre-installed process facilities, respective data used to enable or disable use of each said selected processing facility;
a unit newly enabling a currently disabled use of a selected pre-installed processing facility in response to commercial consideration from a requester of the use and respectively associated use enabling data received via the communication unit, provided as software, or programs, in the form of program recording media.

6. An apparatus as recited in claim 5, wherein the commercial consideration from a requester of the use comprises at least one of the class of commercial considerations including a verbal commercial communication to the requester, an advertisement for visual display to the requester and a payment made, or to be made, by the requester.

7. An apparatus comprising:
a communication unit;
a processing facility;
a first unit disabling use of said processing facility;
a second unit receiving publicity information via said communication unit; and
a third unit newly enabling the use of said processing facility, currently disabled by said disabling unit, under a condition that publicity information received via said communication unit is to be output or displayed.

8. The apparatus according to claim 7, wherein said apparatus further comprises:
a further unit storing the publicity information received via said communication unit and thus updating the publicity information; and
said third unit, outputs or displays the stored latest publicity information.

9. The apparatus according to claim 7, wherein said third unit newly enables the currently disabled use of a processing facility associated with the received publicity information.

10. An apparatus as recited in claim 8, wherein the commercial consideration from a requester of the use comprises at least one of the class of commercial considerations including a verbal commercial communication to the requester, an advertisement for verbal display to the requester and a payment made, or to be made, by the requester.

11. The apparatus according to claim 7, wherein said third unit newly enables the currently disabled use of said processing facility for a given period after a start of use thereof.

12. The apparatus according to claim 7, wherein said processing facility is provided as software or a program to be run by said apparatus.

13. The apparatus according to claim 12, wherein said software or program is provided in the form of a program recording medium.

14. The apparatus according to claim 12, wherein said software or program is received by said communication unit.

15. An apparatus, comprising:
processing facilities;
a first unit disabling use of at least one facility of said apparatus; and
a second unit storing publicity information,
wherein said first unit newly enables the use, currently disabled thereby, under the condition that the publicity information is to be output or displayed.

16. The apparatus according to claim 15, wherein said first unit newly enables the currently disabled use of a processing facility associated with the publicity information.

17. The apparatus according to claim 15, wherein said apparatus newly enables the currently disabled use of said processing facilities for a given period after the start of use.

18. The apparatus according to claim 15, wherein said processing facilities comprise software or programs to be run by said apparatus.

19. The apparatus according to claim 18, wherein said software or programs are provided in the form of program recording media.

20. An apparatus having a communication unit, a plurality of processing facilities, provided as a plurality of software packages and activating software to run the software packages, pre-installed in the apparatus, comprising:
a unit allocating key data to enable a use of at least a respective one of said processing facilities, and normally disabling a current use of the respective processing facility; and
conditioned on commercial consideration from a requester of the use and when the key data is received by said communication unit, the communication unit newly enables the normally and currently disabled use of the software package respectively associated with the received key data.

21. An apparatus having a communication unit, a plurality of software packages and activating software to run the software packages, comprising:
a unit allocating key data to at least a respective one of said software packages and currently disabling current use of the at least one software package; and
when the key data is received by said communication unit, the unit newly enables the currently disabled use of the respective software package associated with the received key data, wherein the currently disabled use of the respective software package to which the key data is allocated is enabled for a given period after a start of use of said apparatus.

22. An apparatus having a communication unit and a display unit, including a processing facility provided as software, and activating the software so as to run the software, said apparatus comprising:
a first unit normally disabling use of the software, and newly enabling a currently, normally disabled use thereof when a commercial program, outputting publicity information on a display screen, is received by said communication unit; and
a second unit activating said commercial program responsively to activation of the software.

23. The apparatus according to claim 22, further comprising a third unit newly enabling the currently, normally disabled use of the software package for a given period of time after the start of enabled use of said apparatus.

24. A method for using an information processing system having a communication means and a plurality of processing facilities provided as a plurality of software packages, and activating software so as to run the software, the method comprising the steps of:

allocating inherent key data to at least one of said software, and disabling use of the software; and enabling the disabled use of the software associated with the key data, when the key data is received by said communication means.

25. The method according to claim 24, further comprising enabling the disabled use of the software to which the key data is allocated for a given period after the start of use of said information processing system.

26. A method for enabling a use-disabled facility in an information processing system having a communication means and display means, including a processing facility provided as software, and activating the software so as to run the software, the method comprising:

a first step for disabling use of the software, and enabling the disabled use when a commercial program for outputting publicity information on a display screen is received by said communication means; and a second step for activating said commercial program responsively to activation of the software.

27. The method according to claim 26, further comprising a third step for enabling the disabled use of the software for a given period after the start of use of said information processing system.

28. An apparatus providing selection use of processing facilities, comprising:

a communication unit;

a source of pre-installed processing facilities having key data respectively associated therewith;

a unit normally disabling use of one or more respective, selected said pre-installed processing facilities and responsive to commercial consideration from a requester of the use and receipt via the communication unit of key data, for a respective, currently disabled processing facility, to selectively enable use thereof.

29. An apparatus as recited in claim 28, wherein:

the pre-installed processing facilities comprise software, or programs to be run by said apparatus.

30. An apparatus as recited in claim 29, wherein:

said software, or programs, are provided in the form of program recording media.

31. An apparatus as recited in claim 28, wherein:

the source comprises software received via the network.

32. An apparatus as recited in claim 28, wherein the commercial consideration from a requester of the use comprises at least one of the class of commercial considerations including a verbal commercial communication to the requester, an advertisement for visual display to the requester and a payment made, or to be made, by the requester.

33. An apparatus comprising:

a communication unit;

a plurality of processing facilities required for each graded apparatus arranged in series based on a difference in their processing facilities and preinstalled therein;

a unit initially disabling use of higher grade facilities than a grade of each respective apparatus; and a unit newly enabling at least one use of the disabled processing facilities to upgrade the apparatus in response to use enabling data received via the communication unit.

* * * * *